Figure 1A:

United States Patent [19]
Chimura et al.

[11] 3,867,332
[45] Feb. 18, 1975

[54] PROCESS FOR THE PRODUCTION OF SHAPED ARTICLES OF A LINEAR POLYESTER

[75] Inventors: Kazuya Chimura, Otake; Kazuo Ito, Tokyo; Yasuo Nakamura; Seiji Miyata, both of Otake, all of Japan

[73] Assignee: Mitsubishi Rayon Company Limited, Tokyo, Japan

[22] Filed: Oct. 30, 1972

[21] Appl. No.: 302,208

[52] U.S. Cl. ............................................. 260/40 P
[51] Int. Cl. ............................................. C08g 51/04
[58] Field of Search .................................. 260/40 P

[56] References Cited
UNITED STATES PATENTS

| | | | |
|---|---|---|---|
| 2,571,319 | 10/1951 | Waters et al. | 260/40 P X |
| 2,649,382 | 8/1953 | Vesce | 260/39 P X |
| 3,361,705 | 1/1968 | Kay et al. | 260/40 P X |
| 3,487,041 | 12/1969 | Okuzumi | 260/40 P |
| 3,489,713 | 1/1970 | Bowman et al. | 260/40 P |
| 3,496,133 | 2/1970 | Hoffman | 260/40 P |

OTHER PUBLICATIONS

J. E. Simpson, "Coloring Plastics," Modern Plastics Ency. (1965), Vol. 42, No. 1A, pp. 417-419.

*Primary Examiner*—Morris Liebman
*Assistant Examiner*—S. M. Person
*Attorney, Agent, or Firm*—Nikaido & Wegner Armstrong

[57] ABSTRACT

An improved method for dispersing a solid additive, such as pigment, in a polyester shaped article wherein the additive is blended with a polyester powder having an apparent density of not greater tha 0.3 g/ml. Such polyester powder may be prepared by abrasively scraping chips of the polyester or by spray drying a solution of the polyester.

20 Claims, 6 Drawing Figures

PROCESS FOR THE PRODUCTION OF SHAPED ARTICLES OF A LINEAR POLYESTER

The invention relates to the manufacture of shaped articles, such as fibers, films and other extruded for molded shaped articles, especially fibers or filaments, composed of a linear polyester having additives incorporated therein such as delusterants, pigments and the like, which are neither melted nor dissolved at temperatures at which said polyester is formed into shaped articles.

As a method for incorporating additives, such as titanium dioxide and other pigments, in a linear polyester, particularly polyethylene terephthalate, said additives being neither melted nor dissolved at temperatures at which said polyester is formed into shaped articles, it is well known in the art to introduce said additives into a polyester forming polycondensation reaction system as a dispersion in a polyester forming monomeric material such as a dispersion in ethylene glycol. With this method, however, certain additives will be decomposed or chemically denatured due to prolonged exposure to polymerization conditions, including considerably high temperatures, and often adversely affect the polyester forming polycondensation reaction. Consequently, additives which may practically be employed in this method are limited. For example, pigments which may successfully be employed in this method are limited to carbon black, titanium dioxide and a few class of organic pigments. Thus, it is currently impossible to providie pre-pigmented textile products having a wide variety of color tones and shades which are comparable with those provided by post-dyeing. Furthermore, in order to produce pigmented products with different colors, every color will require its own polymerization vessel and monomer recovery equipment. Or when a single vessel is employed, every change of color will require repeated washings of the apparatus. All of these requirements will obviously result in additional investment in installations and/or an increased manufacturing cost.

To overcome the difficulties discussed above, it may be considered to incorporate an additive in the polyester just before the polyester is formed into shaped articles. In this case, it is important to achieve a good dispersion of additive in the polyester. Mere blending of the additive with the polyester, which is normally available in the form of chips, and subsequent melt-shaping (such as melt-spinning or melt-extrusion) will often lead to the presence of coarse particles of the additive. This results in non-uniform color and, in the manufacture of fibers, in plugging nozzles and subsequent filament breaks.

To improve the dispersibility of the additive, methods have been proposed in which, in addition to a base polyester, a second polyester is used, the latter polyester being soluble in a solvent such as dichloromethane. German Pat. No. 1,183,195, discloses one of such methods wherein a pigment is dispersed in a solution of the soluble polyester in said solvent and then the solvent is vaporized from the solution to provide a pigment concentrate comprising said soluble polyester having said pigment uniformly dispersed therein. The base polyester may be blended with the pigment concentrate and then melt-shaped. Alternatively, chips of the base polyester may be coated with a solution containing the soluble polyester and the pigment, followed by evaporation of the solvent, as taught in German Pat. No. 1,078,732, and British Pat. No. 844,286.

These methods, however, suffer from disadvantages in that they involve not only a step of solvent removal, but also a need for preparing the second polyester which is usually different from the base polyester. Furthermore, the soluble polyester generally has inferior thermal and mechanical properties to those of the base polyester and, in consequence, the presence of such soluble polyester in final products such as fibers and filaments, often results in substantial deterioration of inherent desirable properties of the final products.

There has also been proposed a method for producing pigmented polyesters wherein no materials other than the pigment and the base polyester are employed. For example, U.S. Pat. No. 3,600,354, describes and claims a method for producing a pigment/polymer concentrate for use in the production of pigmented polymers. This method comprises the steps of treating solid polymer particles to roughen and fissure their surfaces and reduce them to finely divided form; thoroughly mixing the pigment with said treated solid polymer particles at a temperature below the softening temperature of said particle, thereby to form a pigment/polymer mixture with pigment incorporated in said roughened and fissured surfaces; heating and agitating said mixture at a temperature above the softening temperature of said polymer and below the melting point of said polymer, and; maintaining said heating and agitation for a time sufficient to both sinter a plurality of said mixture particles together at their contact surfaces with inclusion of further pigment particles therebetween, and to form pigment/polymer concentrate granules thereof, said concentrate granules having an average size larger than said treated solid particles and having pigment incorporated both in said surfaces of said mixture particles and in said concentrate granules without pigment agglomeration. The pigment/polymer concentrate so prepared may then be thoroughly mixed with a base polymer to produce a pigmented polymer. In short, the method described in this U.S. patent comprises the steps of (i) mechanical comminution of base polymer particles to finely divided form; (ii) mixing the pigment with the comminuted polymer particles at a temperature below the softening temperature of the particle to form a pigment/polymer mixture; (iii) heating and agitating said mixture at a temperature above the softening temperature of the polymer and below the melting temperature of the polymer, and; (iv) maintaining said heating and agitation for a time sufficient to sinter the mixture particles and to form pigment/polymer concentrate granules which are larger than the comminuted polymer particles. Incidentally, the first step, i.e., mechanical comminution of base polyester particles is carried out for example by grinding up polymer chips in a baffle plate impact mill.

The comminuted polyester particles so obtained really have roughened surfaces and increased surface areas. It has been found, however, that adsorption of pigment on the surfaces of such comminuted polyester particles is not satisfactory, unless an intimate mixture of the pigment and the polyester particles is heated and agitated at a temperature above the softening temperature of the polyester for a substantial period of time, as taught by the U.S. patent. It is also noted that such heating and agitation should advantageously be carried out under vacuum or in an inert gas atmosphere. This is especially true in case of producing a pigment-/polyester concentrate for use in the production of pigmented polyester fibers.

It has been unexpectedly found that a linear polyester in the form of powder which has an apparent density of not greater than 0.3 g/ml, as measured by a method defined hereinafter, and may be prepared by processes herein described, can adsorb pigment or other additive on its surfaces to a great extent and can readily be mixed with the pigment or other additive by simple techniques to provide an additive/polyester concentrate which is highly suitable for use in the production of polyester shaped articles, especially fibers or filaments, having the additive uniformly dispersed therein.

Thus, in accordance with the invention there is provided a process for the production of shaped articles of a linear polyester having an additive dispersed therein wherein either an additive/linear polyester concentrate or a linear polyester containing no or a small amount of said additive and in the form of powder, pellet or melt to which said additive/linear polyester concentrate has been added is melt-shaped into desired shaped articles, characterized in that said additive/linear polyester concentrate is prepared by blending the additive with the linear polyester in the form of powder having an apparent density of not greater than 0.3 g/ml.

Figure 1B:
Figure 2A:
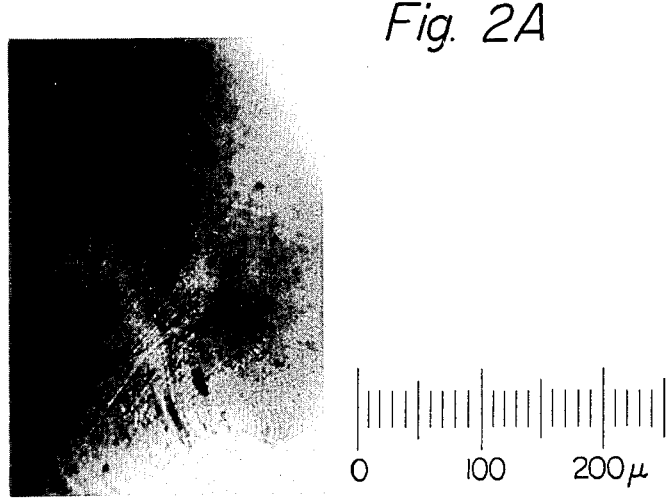
Figure 2B:
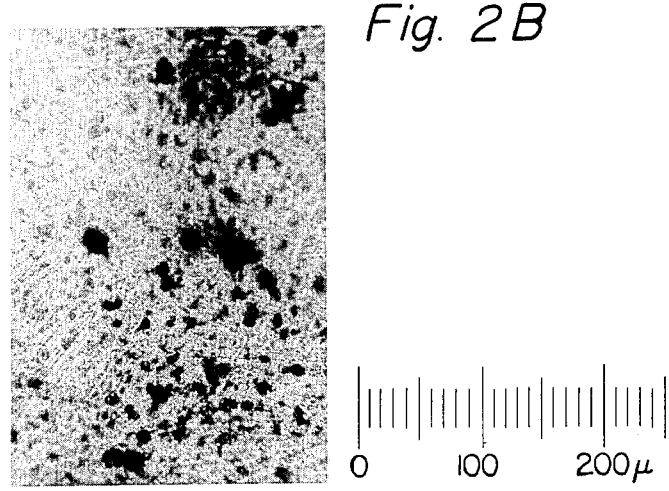
Figure 3:
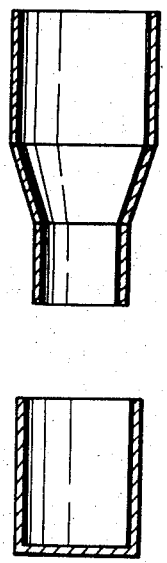
Figure 4:
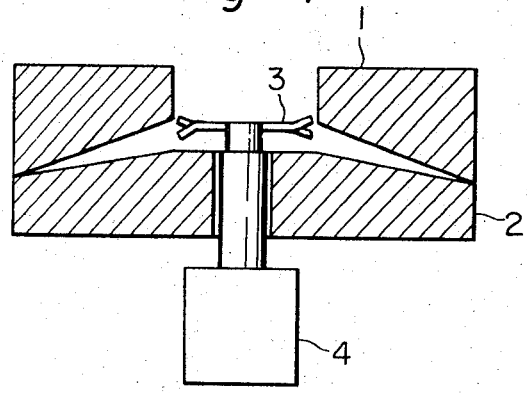

The most essential feature of the invention is to use a linear polyester in the form of powder having an apparent density of not greater than 0.3 g/ml in the preparation of the additive concentrate, which feature will be further illustrated with reference to the attached drawing. In the drawing:

FIG. 1A is a microphotograph (× 65) showing a polyethylene terephthalate powder (A) prepared by abrasively scraping chips of polyethylene terephthalate which powder (A) has an apparent density of 0.16 g/ml and may be employed in the production of the additive/linear polyester concentrate pursuant to the invention, FIG. 1B is a microphotograph (× 65) showing a polyethylene terephthalate powder (B) prepared by grinding up chips of polyethylene terephthalate in a baffle plate impact mill, which powder (B) has an apparent density of 0.54 g/ml and is outside the scope of the invention, FIG. 2A is a microphotograph (× 400) showing a dispersed state of pigment in pigmented chips prepared from the powder (A), as shown in FIG. 1A, according to the invention, FIG. 2B is a microphotograph (× 400) showing a dispersed state of pigment in pigmented chips, outside the scope of the invention, prepared from the powder (B), as shown in FIG. 1B, FIG. 3 shows an assembly which we employed for measuring an apparent density of polyester powder; and, FIG. 4 is a vertical cross-section of a preferred device which may be employed in the production of polyester powder having an apparent density of not greater than 0.3 g/ml.

We have found that mechanical comminution utilizing either a cutting action by a high speed cutter or an impact shock produced in a baffle impact mill is unsuitable for producing a polyester powder having an apparent density of not greater than 0.3 g/ml. With such comminution techniques chips of polyester, e.g., polyethylene terephthalate can be reduced to fairly fine powders having an average particles size of about 300 to 150 microns or less. We have found, however, that the apparent density of the powder so obtained is usually in the order of about 0.5 to 0.7 g/ml, and that typically it has roughened surfaces as seen from FIG. 1B. It has also been found that a satisfactory dispersibility of pigment cannot be achieved by mixing a pigment with the powder (B), unless the mixture is subsequently heat-treated under agitation at a temperature above the softening point of the powder.

In accordance with another feature of the invention, a linear polyester in the form of powder having an apparent density of not greater than 0.3 g/ml is conveniently prepared by a process comprising abrasively scraping chips of the linear polyester. In practice, polyester chips may be passed through a space between two abrasive surfaces closely spaced and relatively moving in a direction perpendicular to the path of the chips thereby subjecting the chips to a shearing abrasive action of the surfaces. FIG. 4 illustrates a preferred device suitable for use in carrying out the abrasive scraping of polyester chips to produce polyester powder having an apparent density of not greater than 0.3 g/ml. Referring to FIG. 4, the device shown comprises an upper annular stationary abrasive member 1 and a lower generally orbicular abrasive member 2 which is rotatable around the axis and disposed coaxially with the upper member 1 and closely spaced apart therefrom to define an annular path for the chips between the lower surface of the upper member and the upper surface of the lower member. A central hole of the upper annular member provides an inlet port for chips, wherein a propeller 3 is provided mounted on the upper end of a shaft which is common to the lower member 2 and driven by a motor 4. Preferably, the annular space between the two abrasive members has decreasing depths of clearance radially outwardly, as shown in FIG. 4. The innermost depth of the clearance should be sufficient to permit chips to enter the annular space, while the outermost depth of the clearance is preferably about 0.05 mm or less. In use, chips are supplied to the inlet port and caused by the rotating propeller 3 to enter the annular space between the two abrasive members, and subjected to a shearing action of the abrasive members as they pass through the annular space to be abrasively worn or scraped at the outer surfaces of the chips.

The abrasive members may comprise abrasive grains, such as Alundum, Carborundum, steel or diamond, of a suitable size bonded together. Such materials are well known and commercially available. Particle size of the polyester powder so obtained primarily depends on a size of the abrasive grains on the surfaces of the abrasive members, but not on the outermost depth of the clearance between the two members, which depth rather determines a size of residual or worn out chips. We have found that abrasive grains having a size of about 80 to 150 mesh preferable in the production polyester powder having an apparent density of not greater than 0.3 g/ml. Water may advantageously be supplied together with the polyester chips, whereby chips are protected from undesirable exotherm during the operation and the efficiency of abrasive scraping is enhanced.

It has also been found that the process can more effectively be carried out if the chips are heat-treated to be well crystallized prior to the abrasive scraping. The heat-treatment may be effected by maintaining the chips in vacuum, in hot air or nitrogen, or in steam, at a temperature of at least 100°C but below the softening point of the chips for a few hours.

Apparently, abrasive materials which may be employed in the practice of the process should preferably have a high resistance against wearing. Contaminations resulting from wearing of the abrasive material employed may be removed from the product by known techniques, e.g., by means of a wet type or dry type cyclone, or electro-statically, if desired.

The process described is particularly useful with polyethylene terephthalate which inherently has a relatively low abrasion resistance, although the process is also applicable to other linear polyesters.

As seen from FIG. 1A, polyester powder having an apparent density of not greater than 0.3 g/ml and prepared by the process described herein has extremely irregular and fibrillated surfaces having many micro-voids. It is believed that when such powder is admixed with an additive, for example, a pigment, chances of contact will be much higher than those expected from a particle size, since the particles of the polymer powder are bulky and have extremely irregular surfaces, and the pigment will be distributed and securely held in the micro-voids in the surfaces of the particles of the polymer powder or between the different particles of the polymer powder losing chances of agglomeration since there are a plenty of micro-voids in the surfaces of the particles of the polymer powder. In fact, it will be seen from FIGS. 2A and 2B that the inventive powder having an apparent density of not greater than 0.3 g/ml enables better dispersibility of pigment in pigmented chips, and certainly in final shaped articles.

In accordance with still another feature of the invention, a linear polyester in the form of powder having an apparent density of not greater than 0.3 g/ml is prepared by a process comprising spray drying a solution of the linear polyester. In practice a solution containing up to 20 percent by weight of said linear polyester in a halohydrocarbon solvent at a temperature of 150°C to 200°C and a pressure of at least 20 kg/cm$^2$ is sprayed through a nozzle into the atmosphere at a lower temperature and a lower pressure, preferably into a substantially normal atmosphere, thereby drying said solution into powder form. The evaporated solvent may be sucked, cooled, recovered and re-used. Suitable hydrocarbon solvents are those chemically inert to the polyester and having a boiling point of 35°C to 100°C, including, for example, dichloromethane, chloroform, trichloroethylene, fluoro-dichloroethane and the like. It has been found that a concentration of the linear polyester in said solution affects to some extent the shapes or configurations and apparent density of the resulting product and, that polymer concentrations substantially higher than 20 percent by weight are not suitable since they often produce products having an apparent density higher than the critical value.

The term "linear polyester" or "polyester" referred to herein means a so-called terephthalate polyester wherein at least 85 mole percent of units derived from dibasic acids or ester-forming functional derivatives thereof are those from terephthalic acid or its ester-forming functional derivatives. Illustrative of such homopolyesters one can mention polyethylene terephthalate, polybutylene terephthalate and polycyclohexyl terephthalate. Copolyesters are also envisaged having combined units incorporated therein such as those derived from isophthalic, adipic, sebatic and other dibasic acids, and ester-forming functional derivatives thereof, as well as those from diethylene glycol, propylene glycol, polyethylene glycol and other glycols. Polyesters which may be employed in the process of the invention may also contain copolymerized units derived from a branching agent such as pentaerythrytol, trimesic acid and the like, as well as those derived from a terminating agent.

The term "additive" or "additives" referred to herein means any one or more additives which are conventionally employed with linear polyesters and are neither melted nor dissolved at temperatures at which the base polyester is formed into shaped articles. Examples of such additives are inorganic pigments such as titanium dioxide, carbon black, cadmium, yellow and the like; organic pigments such as copper phthalocyanine blue, copper phthalocyanine green, and other organic pigments including azo, polyazo, qunacrydone, thioindigo, perylene, perytone, lake, and surene series; inorganic powders such as those of molybdenum disulfide, silicon dioxide, animony trioxide and the like; and metallic powders such as those of aluminum, tin, silver and the like.

According to the invention, any one of such additives or any combination thereof is admixed with a linear polyester having an apparent density of not greater than 0.3 g/ml. The admixture may be carried out either by a dry mixing technique or by a wet mixing technique.

The dry mixing procedure comprises merely mechanically admixing the additive and the polyester powder at ambient temperatures in a suitable known mixer such as a V-type blender, a ribbon blender, a Henschel mixer, a flash mixer and the like. The resulting mixture is not necessarily heat-treated, and may directly be employed in melt-shaping processes to produce shaped articles having the additive uniformly dispersed therein. This is quite in contrast to a prior art process as described in U.S. Pat. No. 3,600,354.

When a high degree of dispersibility of the additive is required, as in the case of producing very fine fibers or filaments, we prefer to employ a wet mixing technique, wherein the polyester powder is added to a dispersion or suspension of the additive in water or in a suitable organic solvent and thoroughly mixed, followed by removing the liquid medium e.g., by filtration and evaporation. Examples of the organic solvents which may be employed as the liquid medium in the practice, of this process are alcohols such as, methanol, ethanol, ethylene glycol and the like; aromatic hydrocarbons such as toluene, benzene and the like; ketones such as acetone methyl ethyl ketone and the like; aliphatic halohydrocarbons such as chloroform, dichloroethane and the like; esters such as ethyl acetate, monomethyl ester of ethylene glycol and the like; and ethers such as diethylether and the like. A particular liquid medium may be selected depending on nature of a particular additive employed.

When a polyester powder in accordance with the invention is added to a suspension of carbon black or an organic pigment in an organic solvent the powder adsorbs the pigment to a great extent, as revealed by the fact that a filtrate obtained by filtration of the mixture through a filter having meshes larger than an average size of the pigment particles and smaller than an average size of the particles of the polyester powder is substantially free from the pigment and is transparent. In contrast thereto, a colored filtrate is obtained with a polyester powder which has been prepared by a conventional mechanical communication technique and has an apparent density of greater than 0.3 g/ml.

When preparing a suspension of an additive, a minor amount of a surfactant or a dispersing agent such as alkyl amines may advantageously be added to improve the dispersibility of the additive in the suspension. The suspension may conveniently be prepared in a mixing device such as a ball mill, a vibromill, a homonizer or a flash mixer, to which the inventive polyester powder may subsequently be added. Alternatively, the admixture of the polyester powder with the suspension of additive may be carried out in a separate mixing device.

Prior to the admixture, the suspension of additive may be passed through a filter of about 50 to 400 meshes to remove any coarse particles of the additive, if desired. Although the admixture may be carried out at room temperature, it is preferred to keep the suspension of additive at elevated temperatures of 30° to 120°C, more preferably 40° to 100°C, during the addition of the polyester powder thereto. Alternatively, after adding the polyester powder to the suspension of the additive at room temperature, the resulting mixture may be heated to a temperatures within the indicated range. Such elevated temperatures advantageously improve the adsorption of the additive onto particles of the polyester powder.

Proportions of the additive and the polyester powder are such that will provide a concentration of the additive which is equal to or higher than that intended in the final shaped article. When a ratio by weight of the inventive polyester powder to the additive is 0.5 1 or more, a polyester powder having an apparent density of greater than the critical value may additionally be employed in both dry and wet mixing processes.

A ratio by weight of the additive to the liquid medium employed in practicing the wet mixing process to prepare a suspension of the additive in the liquid medium can be varied over a wide range depending on the particular additive and liquid medium employed, as well as on conditions under which the final article is intended to be shaped. The suspension can be as thick as a paste, wherein said ratio is 1 : 0.5, or as thin as a diluted one, wherein said ratio is 1 : 50.

A solid product obtained from either dry or wet mixing process can directly be utilized in the final melt-shaping step, alone or in conjunction with a base polyester. Alternatively, it may shaped by any suitable known technique in the form of chips, tablets, pellets, grains or the like, thereby to facilitate handling thereof. For this purpose, conventional devices may be employed for example, a roll mill, mono-, twin- or multi-screw extruder, a taper roll extruder as described in U.S. Pat. No. 3,532,151, a tablet machine and various type of pelletizers.

By terms "additive/polyester concentrate," "additive/linear polyester concentrate" or pigmented chips referred to herein, we include solid products obtained from the mixing processes as well as chips, tablets, pellets, grains and the like formed therefrom.

As previously described, a concentration of the additive in the additive/polyester concentrate is equal to or higher than that intended in the final articles. When the additive/polyester concentrate has been prepared so that it has an additive concentration intended in the final articles, it may as such be supplied to a subsequent step for manufacturing the desired shaped articles such as fibers, filaments, films or other molded articles. When the additive/polyester concentrate has been prepared so that it has an additive concentration higher than that intended in the final articles, it may be added to a base polyester containing no or a minor amount of the additive, and the resulting mixture may be melt-shaped to the final articles. The base polyester to which the inventive additive/polyester concentrate is added can be in the form of powder, chip, pellet or melt.

Depending on the nature of the particular additive employed, beneficial properties are imparted to the final products. For example, when titanium dioxide, or other inorganic or organic pigments are employed as the additive, colored articles having an excellent fastness are economically obtained. Silicon dioxide, molybdenum disulfide and antimony trioxide will impart to the product anti-block property, enhanced slip and retarded flammability, respectively. When carbon black or metallic powder such as an aluminum, tin, copper or silver is incorporated to the shaped articles in accordance with a process of the invention, conductive or anti-static products, or designed yarn products are obtained. According to a process of the invention the additive can readily be well dispersed in the base polyester and in consequence the manufacturing process can stably be operated to produce polyester shaped articles having the additive homogeneously dispersed therein.

The invention will be further illustrated by the following non-limitative examples.

In the examples, an intrinsic viscosity of polyester was measured in a mixed solvent of phenol and tetrachloroethane (1 : 1 by volume) at 25°C.

An apparent density was measured following Japanese Industrial Standard (JIS) K 6911-1970. In this method, a metallic funnel having a finished inner surface and a metallic messcylinder having an inner volume of 100 ± 0.5 ml are employed, as shown in FIG. 3, wherein numericals indicating a dimension of each part are in mm. The funnel is temporally closed at its bottom by a suitable metallic plate, and is charged with about 110 to 120 ml of a well-blended sample to be tested. The plate is then removed and the sample is discharged gravitationally from the funnel to the messcylinder. A portion of the sample rising above the upper edge of the cylinder is removed by moving a straight ruler along the upper edge of the cylinder. The cylinder filled with the sample and an empty cylinder are weighed. The apparent density (A) of the sample is calculated by the following equation:

$$A = (B - C)/D$$

wherein
$A$: An apparent density of the sample in g/ml;
$B$: a weight of the messcylinder filled with the sample (g);
$C$: a weight of the empty messcylinder (g); and
$D$: a volume of the messcylinder (ml).

Measurements of the distribution of particle size of a given sample were conducted by procedures give in JIS K 0069-1966.

EXAMPLE 1

This example shows preparation of a polyester powder having an apparent density of not greater than 0.3 g/ml by a novel mechanical process.

Polyethylene terephthalate chips having dimensions of 5 × 5 × 5 (mm) and an intrinsic viscosity [$\eta$] of 0.72 were heated at 150°C for 3 hours under vacuum. The chips were fed into an abrasive scraping device as shown in FIG. 4 together with 40 parts, based on the weight of the chips, of water and then abrasively scraped at a rate of 20 kg/hr. In the scraping device, the upper abrasive member had an outside diameter of 160 mm and an inside diameter of 50 mm. The lower member had an outside diameter of 160 mm and was rotated at a rate of 3,000 rpm. The members were arranged coaxially with depths of the clearance of 10 mm around the inner edge, and 0.02 mm around the outer edge of the upper member. Both members consisted of Alundum (trademark, manufactured by Norton Co.) of 100 mesh size. The chips and water were fed into the central hole of the upper member and forwarded compulsorily into the clearance by a propeller provided within the central hole. The powder thus discharged with water was separated from water into a vessel equipped with a wire gauze of 400 mesh size in the bottom. Then, the wet powder was centrifugalized, and thereafter dried with hot air of 80°C for 5 hours. Thus, powder (A) was obtained.

For comparison, chips as described above were heated by the same method as above and ground by a conventional grinding machine in which impingement of the chips was effected by a turbine rotating at 4,000 rpm in a cylinder equipped with liner. Thus, powder (B) was obtained.

The apparent density and the distribution of particle size of the resultant powders are shown in Table 1.

Table 1

|  | Power (A) |  | Power (B) |  |
| --- | --- | --- | --- | --- |
| Particle size ($\mu$) |  |  |  |  |
| 1000 or more | 9.5 | weight % | 0.3 | weight % |
| 1000 – 500 | 18.1 |  | 8.5 |  |
| 500 – 297 | 40.2 |  | 23.6 |  |
| 297 – 149 | 16.6 |  | 55.1 |  |
| 149 or less | 15.6 |  | 12.5 |  |
| Apparent density (g/ml) (average) | 0.16 |  | 0.55 |  |

Microphotographs of 65 magnification of the powder (A) and powder (B) are shown in FIGS. 1A and 1B respectively. From the microphotographs, it is obvious that the powder (A) is not very different from the powder (B) in the distribution of particle size, but is remarkably bulky and very irregular in forms, and, also that the particle surface of the powder (A) has a much greater adsorptive property.

Chips as described above, but not heated, were abrasively scraped in the same manner as described above. The resultant powder was similar to the powder (A), but the time required for obtaining the powder was doubled compared to the case of the powder (A). In the case where water was not used, ten times or more times were also required.

When the minimum depth of the clearance between the members was in a value of 0.1 mm, a filmy polymer of 0.05 to 0.12 mm thickness, as well as a powder similar to the powder (A), was obtained in considerable amount.

EXAMPLE 2

This example shows preparation of a polyester powder having an apparent density of not greater than 0.3 g/ml by a novel chemical process.

1 part by weight of polyethylene terephthalate chips as described in Example 1 but not heated, was mixed with 9 parts by weight of dichloromethane and dissolved with stirring for 20 minutes at 200°C under a pressure of 20 kg/cm$^2$ of nitrogen in an autoclave. Then, the autoclave was further pressed to 50 kg/cm$^2$ by nitrogen and the solution was discharged from a nozzle, having a diameter of 1.0 mm, into an atmospheric pressure with a temperature of 25°C to collect the resultant powder on a wire gauze. The vaporized dichloromethane was sucked and passed through a cooling tube and recovered. The wet powder was dried at 70°C under a reduced pressure to yield powder (C).

The apparent density and the distribution of particle size of the powder (C) are shown in Table 2.

Table 2

|  | Powder (C) |  |
| --- | --- | --- |
| Particle size ($\mu$) |  |  |
| 1000 or more | 5.2 | weight % |
| 1000 – 500 | 15.2 |  |
| 500 – 297 | 31.5 |  |
| 297 – 149 | 37.3 |  |
| 149 or less | 10.5 |  |
| Apparent density (g/ml) (average) | 0.11 |  |

For comparison, the process as described above was repeated wherein 30 percent by weight of the polyethylene terephthalate chips were used. The resultant polymer was in a form of flakes of 10 mm length and had a very inferior processability.

EXAMPLE 3

This example shows that a polyester powder having an apparent density of not greater than 0.3 g/ml has an excellent adsorptive property.

Each adsorptive property of the powders (A) and (B) prepared as in Example 1 and the powder (C) prepared as in Example 2 was measured as follows.

The bottom of a chromato-column having a diameter of 20 mm was sealed with absorbent cotton impregnated with methyl ethyl ketone. Then a suspension of 1 part by weight of the powder in 10 by weight of methyl ethyl ketone was poured into the column. After a wet polymer layer was formed in the column, a suspension of 0.1 parts by weight of Cu-Phthalocyanine Blue pigment (C.I. 74160) having the structural formula:

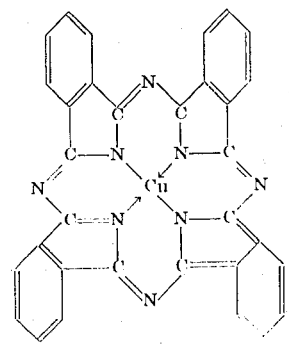

in 20 parts by weight of methyl ethyl ketone was slowly poured from the head of the column. Methyl ethyl ketone was dropped into a beaker from the bottom of the column. A further 20 parts by weight of methyl ethyl ketone was poured into the column and also dropped out into the beaker. The concentration of Cu-Phthalocyanine Blue pigment contained in the liquor thus obtained was measured by a colorimeter and from the value the amount of the pigment adsorped with the powder was calculated.

Thus, the amounts adsorped with the powders (A), (B) and (C) were proved to be 95, 52 and 98 percent, respectively. From the results of this example, it is obvious that the polyester powders (A) and (C) of the present invention are excellent in adsorptive property.

EXAMPLE 4

This example shows that according to the process of the present invention, polyester fibers uniformly dispersed with pigments can be obtained.

10 parts by weight of the powder (A) prepared as in Example 1, and 1 part by weight of Cu-Phthalocyanine Blue pigment (C.I. 74160) were mixed by a Henschel mixer at room temperature for 30 minutes and molded by a single-screw extruder at 270°C to form pigmented chips.

A microphotograph of 500 magnification of a thin leaf of the chip thus obtained is shown in FIG. 2A. From the microphotograph, it is seen that the pigments are present in a uniform and fine distribution.

One part by weight of the pigmented chips and 4 parts by weight of unpigmented polyethylene terephthalate chips were blended by a V-type blender for 10 minutes and dried at 150°C for 5 hours under vacuum. Then, the chips were spun in molten state at 290°C into yarn, through six filters of 200 mesh size stainless wire gauzes, from a nozzle having 36 holes. The discharge rate from the nozzle was 1 g/min per one hole and the take-up speed was 1,300 m/min. During the continuous melt-spinning for 10 hours, yarn breakage did not occur, and the pressure of the nozzle head was a constant value. An increase of the nozzle pressure due to a stopping-up of the filters was not observed. The resultant yarn was subjected to draw and heat treatment at a rate of 600 m/min by means of a pin, having a diameter of 32 mm and heated to 90°C, and a plate, having a length of 300 mm and heated to 160°C. The drawing ratio was 3.3 times. Thus, filament yarn uniformly pigmented in blue color was obtained without difficulty of undesired winding or yarn breakage. The filament yarn had a tensile strength of 5.05 g/d, elongation of 20.0 percent and Young's modulus of 105.5 g/d. These properties were not very different from those of the conventional polyethylene terephthalate fibers which do not contain any pigments.

The process as described above was repeated wherein the powder (C) was used instead of the powder (A). The results were similar to those in case of using the powder (A).

Also, the process as described above was repeated wherein the powder (B) was used to obtain blue chips. A microphotograph of 500 magnification of a thin leaf of the chip is shown in FIG. 2B. From the microphotograph, it is seen that the pigments are present in an ununiform and coarse distribution.

The chips were spun into yarn by the procedure as described above. During the continuous melt-spinning for the first 5 hours, yarn breakage occurred five times. After about 5 hours from the beginning of the spinning, an increase of the nozzle pressure, owing to the stopping-up of the filters, began to take place. After 7 hours spinning was impossible. When the yarn was drawn as described above, undesired winding and yarn breakage often occurred.

EXAMPLE 5

1 part by weight of carbon black was dispersed into 50 parts by weight of ethylene glycol, with 0.01 part by weight of sodium naphthalenesulfonate. 5 parts by weight of the powder (A), prepared as described in Example 1, was mixed into the suspension by stirring with a homomixer. After heating at 50°C for 30 minutes, the mixture was cooled to the room temperature and then ethylene glycol was filtered off. The filtrate contained little carbon black, and was nearly transparent. The black residue was dried at 80°C for 12 hours under vacuum, and then formed into chips at 290°C by a two-screw extruder. Then, one part by weight of the black chips and 9 parts by weight of untreated polyethylene terephthalate chips were blended by a V-type blender for 10 minutes and dried at 150°C for 6 hours under vacuum. The dry chips were then melt spun by the same procedure as described in Example 4. During the continuous spinning for 24 hours, no yarn breakage nor nozzle pressure increase occurred.

The procedure as described above was repeated wherein the powder (B) was used instead of the powder (A). In the filtration, the filtrate contained carbon black in a large amount. Also, when the chips were melt spun, yarn breakage occurred six times during the first ten hours of spinning. After 10 hours from the beginning of the spinning, nozzle pressure increase was observed. After 12 hours, spinning was impossible. During microscopic observation of the section where yarn breakage occurred, coarse pigment having a diameter approaching the yarn diameter was recognized.

Additionally, in the processing of the dry pigmented powders, the apparatuses for spinning and drawing, and the hands of the operators were not stained at all when the powder (A) was used. But in the case where the powder (B) was used, the apparatus were fairly stained.

EXAMPLE 6

Four parts by weight of aqueous pressed cake, containing 25 percent by weight of the organic red pigment having the structural formula:

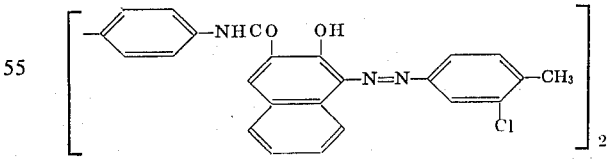

and 0.01 part by weight of stearylamine and 10 parts by weight of methyl ethyl ketone were mixed and dispersed by a ball mill with a number of aluminum balls having a diameter of 10 – 20 mm. The resultant suspension was mixed with 10 parts by weight of the powder (A) prepared as in Example 1 by means of a Henschel mixer at room temperature for 30 minutes. Then methyl ethyl ketone and water were separated from the mixture by a pressure filter. The residual wet powder was dried at 80°C for 5 hours under vacuum, and formed into chips at 280°C by a single-screw extruder. Then, the resultant chips were blended with 40 parts by weight of untreated polyethylene terephthalate chips, and spun as described in Example 4. The spinning could be continued for a considerable length of time without any difficulties. Undesired winding and yarn breakage did not occur during the drawing. Thus, a red filament yarn was obtained.

The powder (B) prepared as in Example 1 was sifted by a sieve with 297 $\mu$ meshes to obtain powder (B') having a particle size not greater than 297 $\mu$. The apparent density of the powder (B') was 0.35 g/ml. Then, the procedure as described above was repeated wherein the powder (B') was used instead of the powder (A). During the spinning for the first 10 hours, yarn breakage occurred four times. Undesired winding and yarn breakage also occurred during the drawing.

EXAMPLE 7

One part by weight of Cu-Phthalocyanine Blue pigment (C.I. 74160) and 5 parts by weight of methyl ethyl ketone were mixed by a Henschel mixer to a paste at 25°C. 10 parts by weight of the powder (A) was then mixed with the paste for 30 minutes at 25°C. The mixture was dried at 80°C for 12 hours under vacuum to yield a pigmented powder. One part by weight of the resultant powder and 10 parts by weight of unpigmented polyethylene terephthalate chips were blended by a V-type blender and spun as described in Example 4. The spinning and the subsequent drawing could be continued for a considerable length of time without any difficulties.

One part of the pigmented powder, prepared as above, was added at 280°C under an atmosphere of nitrogen into 10 parts by weight of polyethylene terephthalate in molten state upon completing the polymerization. These were mixed at 280°C for 20 minutes. The mixture was extruded from the bottom of the polymerization vessel into water in a sheet form, and the sheet was cut into the form of chips. The chips were dried at 160°C for 6 hours under vacuum and then spun. The spinning was carried out for a considerable length of time without any difficulties.

The pigmented powder prepared as above was formed into granules having a diameter of 2 to 5 mm, at 50°C, by a conventional granulator. The pigmented powder was also formed into tablets, having a diameter of 10 mm and a thickness of 3 mm, at room temperature by a tablet machine. Each of the granules and the tablets was blended with unpigmented polyethylene terephthalate chips, to make a diluted mixture with one tenth the concentration, and then spun and drawn. The spinning and the drawing were also carried out stably for a considerable length of time without any difficulties.

The powder (B) prepared as in Example 1 was pigmented as described above and then the pigmented powder was formed into granules or tablets by the procedure described as above. However, no granules or tablets could be formed satisfactorily owing to a lack of sufficient cohesion between the grains.

EXAMPLE 8

Polytetramethylene terephthalate chips having an intrinsic viscosity [$\eta$] of 0.85 were abrasively scraped by the process as described in Example 1 to prepare a powder having an apparent density of 0.12 g/ml. Ten parts by weight of the resultant powder and one part by weight of Cu-Phthalocyanine Blue pigment (C.I. 74160) were mixed by a Henschel mixer for 30 minutes. Then, the mixture was melted and blended at a temperature of 240°C, by a blender composed of a pair of five-stepped frusto-conical rolls, and then formed into chips. Each roll of the blender had a smaller diameter of 100 mm, a larger diameter of 150 mm and a length of 150 mm; the rolls were arranged with a gap of 1 mm side-by-side in such a manner that the roll surfaces of the respective rolls converge toward each other. One part by weight of the chips thus obtained and 9 parts by weight of unpigmented polytetramethylene terephthalate chips were blended and then spun by the procedure as described in Example 4, wherein the temperatures was changed to 250°C, and drawn as described in Example 4. The spinning and the drawing were stably carried out for a considerable length of time without any difficulties.

EXAMPLE 9

One part by weight of the powders (A) and (B), prepared as in Example 1, were blended by a V-type blender. The apparent density of the mixture was 0.28 g/ml, whereas the density calculated by the arithmetic mean was 0.35 g/ml. It appears that this difference between the apparent density and the calculated density results from a tendency of the powder (B) to be captured by the other powder (A) on the surface thereof.

Ten parts by weight of the mixture and 0.5 parts by weight of Cu-Phthalocyanine Green pigment (C.I. 74260) having the structural formula:

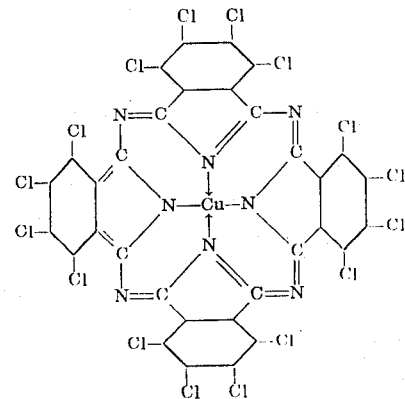

were blended by a V-type blender and then directly melted and mixed by a blender having a pair of five-stepped rolls as described in Example 8. Thereafter, the mixture was formed into chips at 290°C. The intrinsic viscosity [$\eta$] of the chips was 0.73 in a value revised with respect to the pigment. The chips were blended with unpigmented polyethylene terephthalate chips, to make mixture diluted with one tenth the concentration and the mixture was spun and drawn as described in Example 4. The spinning and the drawing were stably carried out for a considerable length of time without any difficulties.

EXAMPLE 10

One part by weight of silicon dioxide having an average diameter of 0.5 μ, and 19 parts by weight of the powder (A), prepared as in Example 1, were mixed by a Henschel mixer at 25°C and dried at 160°C for 3 hours under vacuum. Then, the mixture was spun and drawn by the procedure as described in Example 4. Thus, a yarn containing silicon dioxide was obtained without any difficulties.

The procedure as described above was repeated wherein aluminum powder having an average diameter of not greater than 1 μ was used instead of silicon dioxide. The results were satisfactory. In the case where molybdenum disulfide having an average diameter of not greater than 1 μ was used, the results were also satisfactory.

What is claimed is:

1. A process for the production of a linear polyester shaped material having homogeneously dispersed therein an additive which comprises melt shaping a polymer mixture which is either
   a. an additive/linear polyester concentrate; or
   b. a linear polyester in the form of a powder, pellet or melt having added therein an additive/linear polyester concentrate wherein said polymer mixture prior to said melt shaping is in the form of a powder having an apparent density of up to 0.3 g/ml said powder having been prepared by either abrasively scraping chips of the polyester or spray drying a solution of the polyester.

2. A process of claim 1 wherein said additive/linear polyester concentrate is prepared by admixing the additive with abrasively scraped powder of the linear polyester having an apparent density of not greater than 0.3 g/ml.

3. A process of claim 1, wherein said additive/linear polyester concentrate is prepared by admixing the additive with spray dried powder of the linear polyester having an apparent density of not greater than 0.3 g/ml.

4. A process in accordance with claim 1 wherein said additive/linear polyester concentrate is prepared by admixing at least one additive selected from titanium dioxide, inorganic pigments, organic pigments, silicon dioxide, molybdenum disulfide,, antimony trioxide, aluminum powder, copper powder and silver powder with the linear polyester in the form of powder having an apparent density of not greater than 0.3 g/ml.

5. A process in accordance with claim 1 wherein said additive/linear polyester concentrate is in the form of powder, pellet, grain, tablet or chip.

6. A process in accordance with claim 1 wherein the linear polyester is selected from polyethyleneterephthalate, polytetramethyleneterephthalate, polycyclohexylterephthalate and their copolyesters.

7. A process in accordance with claim 2 wherein said abrasively scraped powder is prepared by passing chips of the linear polyester through a space between two abrasive surfaces closely spaced and relatively moving in a direction perpendicular to the path of the chips thereby subjecting the chips to a shearing abrasive action of the surfaces.

8. A process in accordance with claim 7 wherein each of said abrasive surface comprises bonded abrasive grains having a grain size of 80 to 150 mesh.

9. A process in accordance with claim 8 wherein the abrasive material is selected from Alundum, Carborundum, steel and diamond.

10. A process in accordance with claim 7 wherein said two abrasive surfaces define an annular path for the chips with decreasing depths of clearance, the depth of clearance at the end of the path being not greater than 0.05 mm.

11. A process in accordance with claim 7 wherein the chips of linear polyester are fed to the space between the abrasive surfaces together with water.

12. A process in accordance with claim 7 wherein the chips of linear polyester are crystallized by heat treatment and thereafter abrasively scraped by a process in accordance with claim 7.

13. A process in accordance with claim 3 wherein said spray dried powder is prepared by spraying a solution containing up to 20 percent by weight of the linear polyester in a halohydrocarbon solvent at a temperature of 150°C to 200°C and a pressure of at least 20 kg/cm² through a nozzle into the atmosphere at a lower temperature and a lower pressure, thereby drying said solution into powder form.

14. A process in accordance with claim 13 wherein said halohydrocarbon solvent is selected from dichloromethane, chloroform, trichloroethane and fluorodichloroethane.

15. A process in accordance with claim 1 wherein the additive and the polyester powder are admixed mechanically.

16. A process in accordance with claim 1 wherein the additive and the polyester powder are admixed in a liquid medium.

17. A process in accordance with claim 16 wherein a suspension of the additive in the liquid medium is admixed with the polyester powder.

18. A process in accordance with claim 17 wherein the suspension and the polyester powder are admixed at a temperature of 30°C to 120°C.

19. A process in accordance with claim 17 wherein the suspension comprises a minor amount of a dispersant aid selected from surfactants and suspension agents.

20. A process in accordance with claim 17 wherein said liquid medium is selected from water, methanol, ethanol, ethylene glycol, benzene, toluene, chloroform, dichloroethane, tetrachloroethane, chlorobenzene, ethyl acetate, monomethyl ether of ethylene glycol, acetone and methyl ethyl ketone, diethyl ether.

* * * * *